United States Patent [19]

Grijalva

[11] 3,729,705
[45] Apr. 24, 1973

[54] METHODS AND APPARATUS FOR ACOUSTIC LOGGING IN CASED WELL BORES

[75] Inventor: Victor E. Grijalva, El Marquez, Venezuela

[73] Assignee: Schlumberger Technology Corporation, New York, N.Y.

[22] Filed: Dec. 29, 1969

[21] Appl. No.: 888,695

[52] U.S. Cl. ........ 340/18 AC, 340/18 A, 340/15.5 C, 181/.5 BI, 340/15.5 M
[51] Int. Cl. ................................................. G01v 1/16
[58] Field of Search ........................ 340/18 AC; 181/.5 BI; 340/15.5 C, 15.5 M

[56] References Cited

UNITED STATES PATENTS

| 3,174,577 | 3/1965 | Holley | 340/18 AC |
|---|---|---|---|
| 3,093,810 | 6/1963 | Geyer et al. | 340/18 A |
| 3,401,773 | 9/1968 | Synnott | 181/.5 BI |
| 3,358,788 | 12/1967 | Wilson | 181/.5 BI |
| 3,102,992 | 9/1963 | Savage et al. | 340/15.5 |
| 3,339,666 | 9/1967 | McDonald | 181/.5 BI |

Primary Examiner—Benjamin A. Borchelt
Assistant Examiner—N. Moskowitz
Attorney—Brumbaugh, Graves, Donohue & Raymond, G. Brumbaugh, Jr. and Nesbitt & Neuner

[57] ABSTRACT

In accordance with illustrative embodiments of the present invention, techniques are disclosed for producing well logging information which is especially suitable for the evaluation of cased well bores. More particularly, a well logging tool has two acoustic receivers spaced apart from a repetitively energized acoustic transmitter. The amplitude of a selected portion of each electrical signal produced by the receiver nearest the transmitter in response to the emitted energy is measured to produce a log of the bonding of the casing to the cement surrounding the casing. The electrical signals produced by the receiver farthest from the transmitter are used to produce a variable density log which can be used in conjunction with the cement bond log to evaluate the bonding of the cement to both the casing and the formations which surround the cement.

8 Claims, 8 Drawing Figures

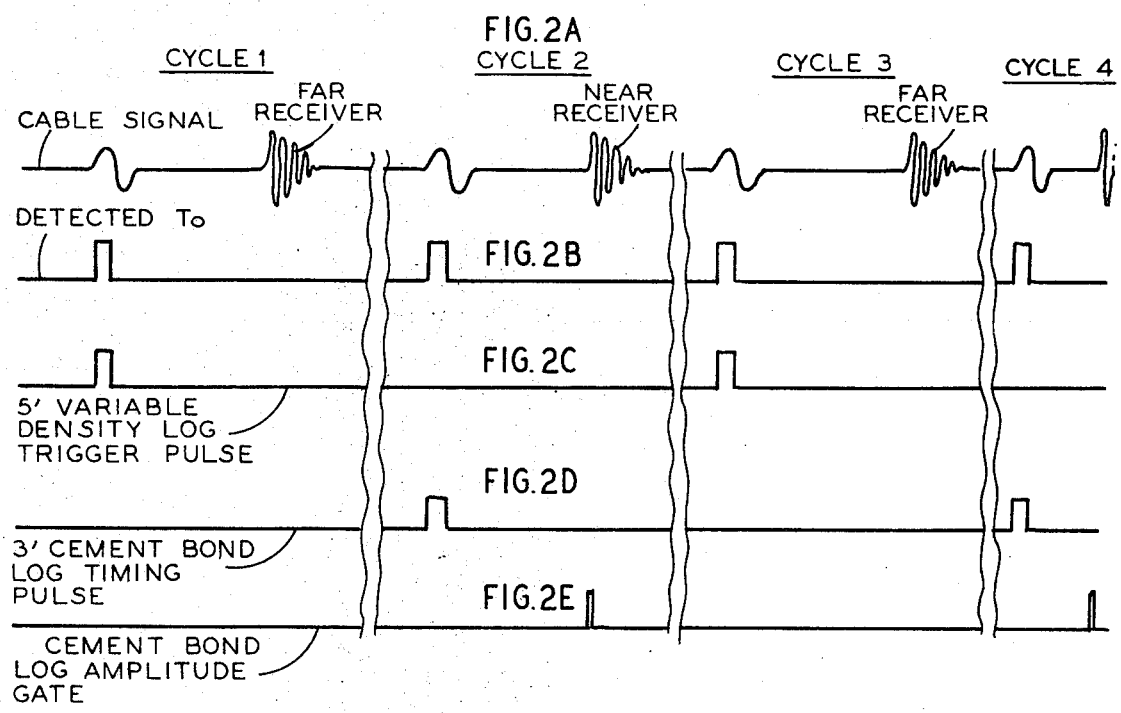
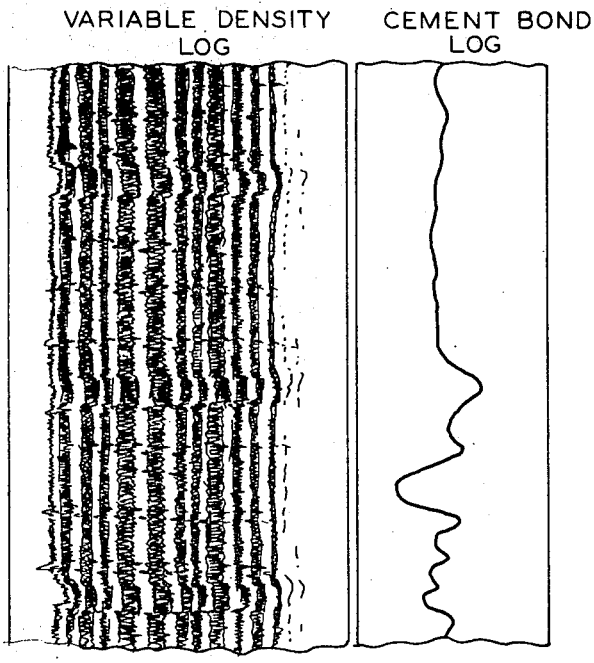

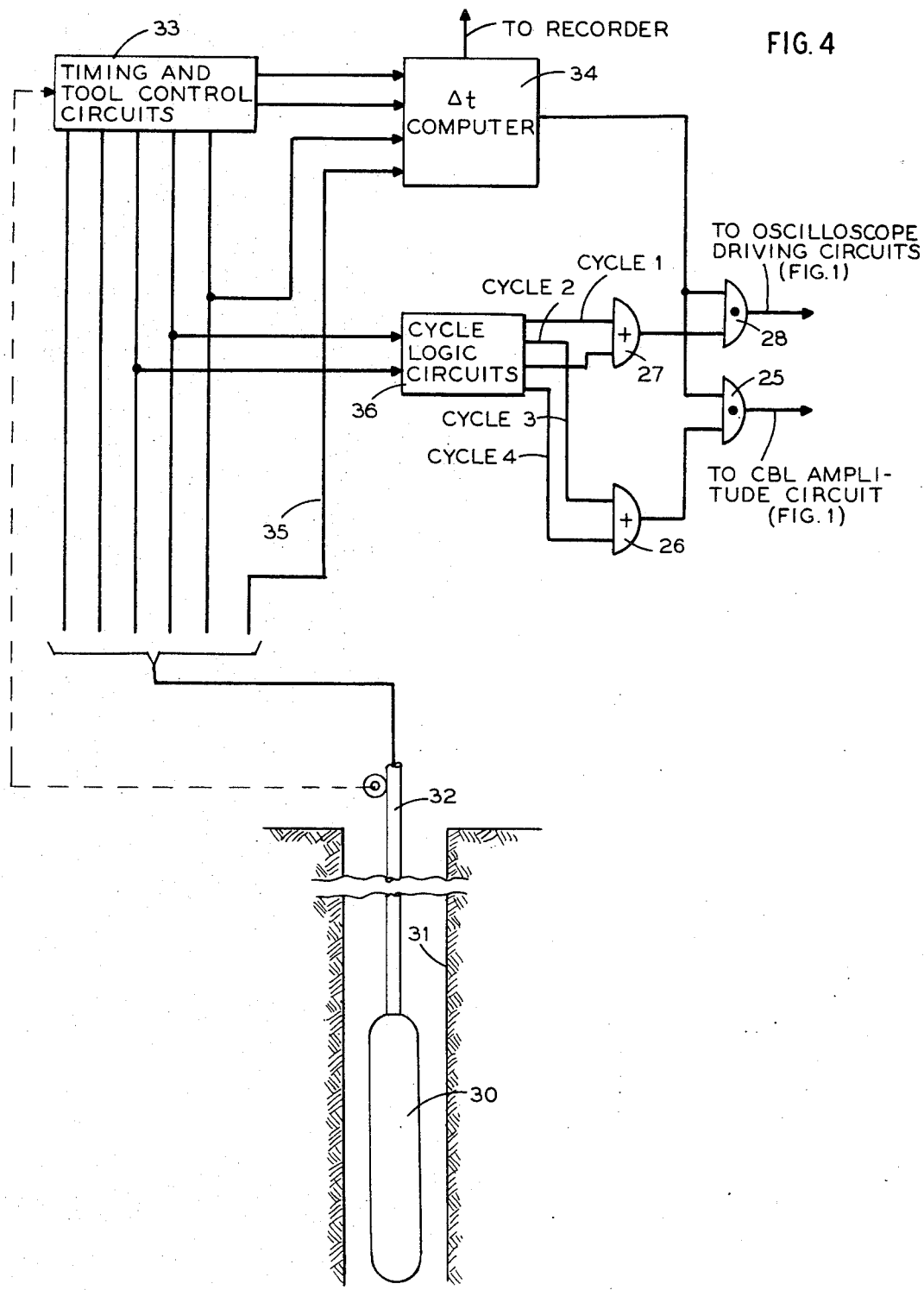

METHODS AND APPARATUS FOR ACOUSTIC LOGGING IN CASED WELL BORES

The present invention relates to acoustic logging methods and apparatus for use in well bores and, more particularly, to acoustic apparatus for investigating the nature of acoustic coupling between a casing and materials disposed to the exterior of the casing.

In a typical well completion operation, a casing is positioned in the borehole and cement is pumped into the annulus defined between the casing and borehole. For various reasons the cement may fail to completely fill the annulus along the length of the casing, which often results in a condition generally known as "channeling". Moreover, portions of the column of cement may fail to bond to the casing or formations. In such instances, fluid and/or gases of formations at other depth levels may migrate along the imperfections in this column of cement. Thus, if a production sand is completed as by perforation in a zone which includes such imperfections, fluids or gases from other formations may impair the production of hydrocarbons from the sand.

One way in which the nature of the material adjacent to the casing can be investigated is to measure the acoustic coupling of the casing and the materials adjacent thereto as set forth in U. S. Pat. No. 3,340,955 granted to Lee H. Gollwitzer on Sept. 12, 1967. This acoustic coupling can be measured by measuring the first half cycle of the acoustic energy received by an acoustic receiver spaced apart from a nearby acoustic transmitter upon energization of the transmitter. The amplitude of this first arrival is indicative of the amount of casing pipe circumference bonded to the cement.

If the cement is well bonded to both the casing and the formation, the transmitted acoustic energy is very efficiently transmitted from the casing to the cement to the formation thus leaving little acoustic energy in the casing. As a result, the acoustic energy traveling through the casing is very weak because of this coupling of a large amount of energy through the cement to the formation. The energy traveling through the formation on the other hand will be very strong. Since the acoustic energy passing through the casing will usually arrive at the receiver first, the first acoustic energy arrival, i.e., the first half cycle of the received energy, will be very weak. Thus, a low amplitude first arrival will indicate good bonding of cement to both the casing and formation.

If, on the other hand, the cement is well bonded to the casing, but poorly bonded to the formation, very little acoustic energy will remain in the casing and the cement will attenuate the transmitted energy. Moreover, because of the lack of a good bond to the formation, the energy received at the acoustic receiver which has traveled through the formation will also be weak. However, since only the amplitude of the first energy arrival is measured, it is difficult to distinguish between the case where the cement is well bonded to both the formation and casing and the case where the cement is well bonded to the casing but not the formation.

If, on the other hand, the cement is not well bonded to the casing, the acoustic energy will travel through the casing to the acoustic receiver with very little coupling to the cement. In this case, the first acoustic energy arrival will be significant and the energy arriving at the receiver which has passed through the formation will be relatively weak. Thus, for poor bonding of cement to casing, the cement bond log will show a large amplitude.

It is also possible to have a condition where a small annulus is formed between the casing and cement. This would occur in a so-called squeeze operation where considerable pressure has been applied to the casing and then released. It would also occur for conditions that do not permit good casing to cement bond, as for example, grease on the casing, mil varnish on new pipe, etc. In this case, the cement-to-casing seal may be sufficient to prevent fluid movement even though the casing-to-cement bond is not very good. Since the pipe is not effectively coupled to the cement, considerable acoustic energy remains in the casing so that moderately large amounts of energy passing through the casing are received by the acoustic receiver. If the cement-to-formation bond is good, some acoustic energy is transmitted through the microannulus and is effectively coupled to the formation by the good cement-to-formation bond. In this situation, the first casing arrival would be significant to thereby distinguish this case from the case where the cement is not bonded to either the casing pipe or formation. However, a cement bond log would indicate a bad cement job since it is giving a measure of only the first energy arrival.

There are other factors which may affect the readings given by the cement bond log other than the quality of the cement bonding. For example, if gas is present in the mud contained in the well bore, the entire wave train of acoustic energy received by the acoustic receiver will be attenuated. In this case, a cement bond log might be interpreted as showing good bonding, which may or may not exist.

Another manner in which cement bonding may be investigated is to produce a so-called "variable density log". Such a log is typically produced by sweeping an electron beam across the face of an oscilloscope and modulating the beam intensity with the received acoustic energy signal waveform while moving a film past the scope face. However, a variable density log alone does not give all of the answers either since it does not give a quantitative measure of cement bonding, as does the cement bond log. Moreover, as in present practice, cement bond and variable density logs are obtained on separate runs into the well bore thus giving the usual correlation problems associated with separate runs.

It is therefore an object of the present invention to provide a well logging system for simultaneously producing cement bond and variable density logs.

In accordance with the present invention, systems and methods for investigating the media forming a cased well bore comprise moving a well tool having at least one acoustic transmitter and at least two spaced apart acoustic receivers through a borehole. The acoustic transmitter is repetitively energized to emit energy into the media surrounding the well tool and a timing pulse representative of the time of this energization is produced. At least a portion of this emitted energy is received by the acoustic receivers to produce electrical signals representative of the received energy. The invention further comprises measuring the amplitude of each first arrival of the signal produced by the receiver nearest the transmitter to produce an output signal representative of the bonding between the casing and cement surrounding the casing and recording this output signal to produce a log indicative of the bonding between the casing and cement. Furthermore, by using selected timing pulses and signals produced by the receiver farthest from the transmitter, a variable density record of the signals produced by the farthest receiver can be produced. By this arrangement, a variable density record can be produced simultaneously with a cement bond log to provide information suitable to evaluate the media forming a cased well bore.

For a better understanding of the present invention, together with other and further objects thereof, reference is had to the following description taken in connection with the accompanying drawings, the scope of the invention being pointed out in the appended claims.

Referring to the drawings:

FIGS. 2A–2D show waveforms for various signals found in the circuitry of FIG. 1; and FIG. 3 is an example of logs produced by the FIG. 1 system; and FIG. 4 is a schematic diagram of an acoustic logging system constructed in accordance with the invention for simultaneously producing a cement band log and a variable density log.

Figure 1:
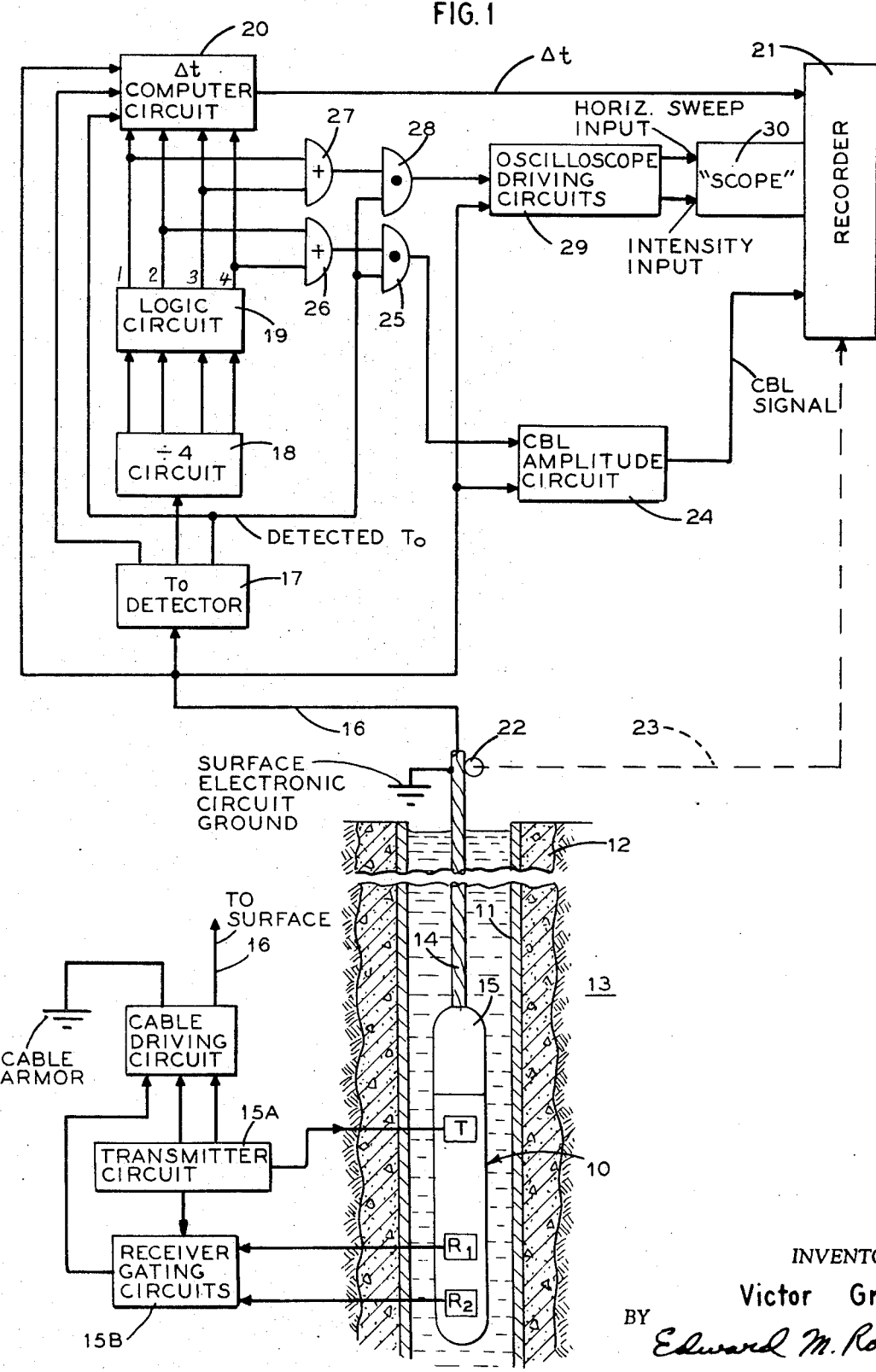
FIG. 1 is a schematic diagram of an acoustic logging system constructed in accordance with the present invention.

Referring now to FIG. 1, an acoustic well logging tool 10 is located in a well bore which comprises a casing 11 and cement 12 adjacent to earth formations 13. The well tool 10 is supported in the well bore by, in this example, an armored monoconductor cable 14 which is reeled in and out of the well bore at the surface of the earth by a suitable drum and winch mechanism (not shown).

The well tool 10 includes an acoustic transmitter T and two spaced apart acoustic receivers $R_1$ and $R_2$. The well tool 10 also includes a fluid tight pressure resistant electrical housing unit 15 which contains electrical circuitry utilized in energizing the transmitter T and processing the signals produced by the receivers $R_1$ and $R_2$ for transmission to the surface of the earth. Within the housing 15, a transmitter circuit 15A repetitively energizes the acoustic transmitter T which emits acoustic energy into the media surrounding the well tool 10. This energy propagates to the acoustic receivers $R_1$ and $R_2$ and causes them to produce electrical signals. Under control of the transmitter circuit 15A, receiver gating circuits 15B operate to pass the signals produced by the receivers $R_1$ and $R_2$ on successive cycles of operation where one cycle includes one emission of energy. The transmitter circuit 15A generates sync pulses which indicate the time at which the transmitter T is fired as well as which receiver signal has been gated by the circuits 15B. The selected receiver signal and the sync pulses are applied to a cable driving circuit 15C for application to the surface of the earth. For a more detailed explanation of this circuitry, see copending application Ser. No. 846,907 filed by Geary L. Leger on Aug. 1, 1969. As set forth in this copending Leger application, the signals are transmitted to the surface in a four cycle mode with the far receiver $R_2$ signal being transmitted during cycles 1 and 3 and the near receiver $R_1$ signal being transmitted during cycles 2 and 4. A waveform example of the signals transmitted during the four cycles of operation is shown in FIG. 2A.

At the surface of the earth, the transmitted electrical signals are applied to a $t_o$ detector 17 which operates to detect these $t_o$ pulses and separate them from other signals transmitted to the surface of the earth. These detected $t_o$ pulses are shown in FIG. 2B. The detected $t_o$ pulses are applied to a divide-by-four counter 18 which counts the $t_o$ pulses to a maximum of four and then resets itself. A logic circuit 19 is responsive to the output of the individual flip-flops making up the counter 18 for producing discrete signals representing the above-discussed four cycles of operation. Thus, each $t_o$ pulse applied to the divide-by-four counter 18 signals the start of a new cycle of operation.

Certain signals derived from the $t_o$ detector 17, as well as the transmitted signals on conductor 16, are applied to a $\Delta t$ computing circuit 20 which operates to compute the travel time for the transmitted acoustic energy to pass from the transmitter T to one or both of the acoustic receivers $R_1$ and $R_2$. Either the travel time between the receivers $R_1$ and $R_2$ could be measured, as illustrated in the above-mentioned copending Leger application or the travel time between the transmitter T and one of the receivers $R_1$ or $R_2$ could be measured, as illustrated in copending application Ser. No. 888,694 filed by C. L. LaFleur on Dec. 29, 1969. The resulting $\Delta t$ measurement is recorded by a recorder 21 whose record medium (film) is driven as a function of well tool movement by a rotating shaft 23. The shaft 23 is driven by a wheel 22 in engagement with the cable 14.

The transmitted acoustic signals from the well tool 10 are also applied to a cement bond log amplitude circuit 24 which also receives selected ones of the detected $t_o$ pulses from the $t_o$ detector 17 via an AND gate 25. These gated $t_o$ pulses are utilized as a timing source to enable the amplitude of the first half cycle of the acoustic energy received by the near receiver $R_1$ to be measured. The details of the CBL amplitude circuit 24 can be found in the above-mentioned Gollwitzer U.S. Pat. No. 3,340,955 and need not be discussed further here. The CBL amplitude circuit 24 produces an output signal whose amplitude is proportional to a time average value of the amplitude of the first energy arrival at the near receiver $R_1$. This output signal is applied to the recorder 21 to produce a cement bond log.

As discussed earlier, a cement bond log by itself may not always give the complete answer to the condition of the cement bonding. To aid in interpreting the cement bond log, in accordance with the present invention, a variable density log of the complete wave train of acoustic energy arriving at the far receiver $R_2$ is also produced by the apparatus of FIG. 1 simultaneously with the making of the cement bond log.

Before discussing how both a cement bond log and variable density log are produced by the apparatus of FIG. 1, it would first be desirable to explain the optimum acoustic transducer array for simultaneously producing both logs. In selecting the transmitter-to-receiver spacing for the cement bond log, there are conflicting considerations which must be taken into account. If the receiver is positioned too closely to the transmitter, the energy propagating through the mud column will mask the energy passing through the casing which is received by the receiver. This can be overcome by moving the receiver away from the transmitter such that the acoustic energy passing through the mud column will, at the receiver, be attenuated to a level which is much less than the level of the energy which has passed through the casing. Due to casing attenuation in cement, if the receiver is moved too far away from the transmitter, changes in the amplitude of the first casing arrival will be small making cement bond evaluation exceedingly difficult. For this reason, the receiver cannot be positioned too far from the transmitter. It has been found that a transmitter-to-receiver spacing of approximately 3-feet produces very good results when making a cement bond log.

For the variable density log, on the other hand, one wants to obtain a clear picture of the formation compression waves and thus the formation wave should be much stronger than that part of the casing wave which arrives at the receiver at the same time and interferes with it. It has been found that the transmitter-to-receiver spacing for a variable density log should be somewhat greater than 3-feet to enable the energy passing through the casing to be sufficiently attenuated in cement at the receiver so that the formation arrival can be clearly seen. It has been found that a transmitter-to-receiver spacing of approximately 5-feet provides very good results when making a variable density log.

Therefore, in FIG. 1, the spacing between the transmitter T and near receiver $R_1$ is desirably 3-feet and the spacing between the transmitter T and far receiver $R_2$ is desirably 5-feet.

Referring back to the surface apparatus of FIG. 1, the cycle 2 and 4 output signals from logic circuit 19 are combined in an OR gate 26 and utilized to enable the AND gate 25 to pass the detected $t_o$ pulses to the CBL amplitude circuit 24. These gated $t_o$ pulses are illustrated in FIG. 2D. The CBL amplitude circuit 24 operates to open a gate a fixed time interval after each detected $t_o$ pulse to measure the amplitude of the first arrival as illustrated in FIG. 2E. Since the near receiver $R_1$ signal is transmitted to the surface of the earth only during cycles 2 and 4 and the CBL amplitude circuit 24 is energized only during cycles 2 and 4, it can be seen that the CBL amplitude circuit will only be responsive to signals from the near receiver $R_1$.

The cycles 1 and 3 output signals of logic circuit 19 are combined in an OR gate 27 and applied to one input of an AND gate 28. The detected $t_o$ pulse from detector 17 comprises the other input to AND gate 28, the output thereof being connected to oscilloscope driving circuits 29. Thus, during cycles 1 and 3, the detected $t_o$ pulse is applied to oscilloscope driving circuits 29. These gated $t_o$ pulses are shown in FIG. 2C. The cable signal from conductor 16 is also applied to the oscilloscope driving circuits 29.

Each detected $t_o$ pulse during cycles 1 and 3 is utilized by the oscilloscope driving circuits 29 to cause a horizontal sweep voltage to be generated for application to the horizontal sweep input of an oscilloscope 30. After some processing by the oscilloscope driving circuits 29, the cable signal from conductor 16 is applied to the intensity input of the oscilloscope 30 such that the sweeping electron beam will be varied in intensity as a function of the signal amplitude of the incoming cable signal. The details of the oscilloscope driving circuits 29 are shown in copending application Ser. No. 829,159, filed by Theodore F. Brunn on May 26, 1969.

The face of the oscilloscope 30 adjoins the recorder 21 so as to produce a variable density log on the film within the recorder 21. Since the film moves as a function of the movement of the well tool, each sweep across the face of the oscilloscope 30 produces a line at a different location on the film to thereby produce a raster which, when complete, gives a variable density log. An example of such a variable density log is shown in track 1 of the log presentation of FIG. 3. Track 2 illustrates a typical cement bond log.

In addition to the arrangement of FIG. 1, the simultaneous production of both a cement bond log and variable density log could be accomplished with other systems. For example, the acoustic logging system shown and described in U. S. Pat. No. 3,257,639 granted to F. P. Kokesh on June 21, 1966 could also be used in modified form for this purpose.

Referring to FIG. 4 which is a simplified block diagram of the Kokesh system, a well tool 30 is disposed in a borehole 31 on the end of a cable 32. A "timing and tool control circuit" 33 operates to energize the transmitter (not shown) in the well tool 30, determine the cycle of operation, and inform the tool 30 of this cycle. A $\Delta t$ computer 34 is responsive to certain signals from the timing and tool control circuits 33 as well as signals from the tool on a conductor 35 for computing the travel time $\Delta t$. This portion of FIG. 4 discussed thus far can be found in the Kokesh patent and thus need not be discussed further here.

In addition to the apparatus of the Kokesh system, the FIG. 4 apparatus of the present invention includes apparatus for producing a short transmitter-receiver spacing (e.g., 3-feet) cement bond log and a long transmitter-to-receiver spacing (e.g., 5-feet) variable density log. To accomplish this, certain signals from the timing and tool control circuits 33 are applied to a "cycle logic circuit" 36 which produces 4 discrete signals corresponding to the 4 cycles of operation of the system. (The signals applied to the cycle logic circuit 36 could take the form of the signals from flip-flops 27 and 28 in FIG. 2 of the Kokesh Patent.) The cycle 1–4 output conductors from logic circuit 36 are then applied to the OR gates 26 and 27 and AND gates 25 and 28 in the same manner as in FIG. 1. The detected $t_o$ pulse from the $\Delta t$ computer 34 is also applied to the AND gates 25 and 28. The outputs of the AND gates 25 and 28 are applied to the CBL amplitude circuit and oscilloscope driving circuits of FIG. 1 to thereby cause a short spacing cement bond log and a long spacing variable density log to be produced in the same manner as in FIG. 1.

By producing both a cement bond log and variable density log with the apparatus of FIG. 1, the quality of a cement job can be readily and accurately determined. Thus, for example, where the cement is poorly bonded to the casing pipe, the CBL log will show a high amplitude casing arrival and the variable density log will indicate a low amplitude formation arrival such that the combination of the cement log and variable density log will give the necessary information. If on the other hand, a thin cement sheath is bonded to the casing but poorly bonded to the formation, or for the case of a microannulus, the cement bond log will show a relatively high amplitude, the same as for the case where cement is poorly bonded to both the casing and formation. However, these situations can be distinguished when the variable density log is available due to high amplitude formation arrivals showing up on the variable density log for the thin cement sheath and microannulus cases.

If the cement is well bonded to both formation and casing, the first arrival, i.e., the casing arrival, will have a low amplitude and the formation arrival will have a high amplitude. Thus, the cement bond log will show a low amplitude and the variable density log will show a strong formation arrival. If, on the other hand, the pipe is bonded to a thick cement sheath which is not bonded to the formation or if gas is present in the well bore, the cement bond log will also show a low amplitude but the variable density log will show low energy formation arrival thus enabling distinction of these various situations from one another.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating characteristics of the media forming a cased well bore having a cement annulus between the casing and the surrounding earth formations, comprising:
   a well tool having an acoustic transmitter and two acoustic receivers spaced therefrom at different distances;
   means for repetitively energizing said acoustic transmitter to emit energy into the media surrounding said well tool and producing timing pulses representative of the times of energization, at least a portion of said energy being received by said acoustic receivers which produce electrical signals representative of said received energy;
   means for measuring the amplitude of a selected portion of at least some signals produced by the receiver nearest said transmitter in response to acoustic energy transmitted to said nearest receiver at least in part through the casing to produce an output signal representative of the bonding between the casing and cement surrounding said casing;
   means for recording said output signal to produce a log indicative of the bonding between the casing and cement; and
   means responsive to selected timing pulses and selected signals produced by the receiver farthest from said transmitter in response to acoustic energy transmitted to said farthest receiver at least in part through the media surrounding the casing for producing a variable density record of the signals produced by said farthest receiver, whereby said variable density record can be used in conjunction with said cement bond log to evaluate the cement bonding.

2. The apparatus of claim 1 wherein said means for producing a variable density record includes a record medium, means for sweeping a radiant energy beam across said record medium, means responsive to selected timing pulses for initiating the sweep of said beam, and means for modulating the intensity of said beam with representations of signals produced by said farthest receiver to thereby produce a variable density record on said record medium.

3. The apparatus of claim 1 wherein said receiver nearest said transmitter is located approximately three feet from said transmitter and said receiver farthest from said transmitter is located approximately five feet from said transmitter.

4. Apparatus for investigating characteristics of the media forming a cased well bore having a cement annulus located between the casing and the surrounding earth formations, comprising:
   a well tool having an acoustic transmitter and two acoustic receivers spaced therefrom at different distances;
   means for repetitively energizing said acoustic transmitter to emit energy into the media surrounding said well tool and producing timing pulses representative of the times of energization, at least a portion of said energy being received by said acoustic receivers which produce electrical signals representative of said received energy;
   means operative in a time relationship with each emission of energy for selecting the electrical signal from one of said receivers for each energy emission for transmission to the surface of the earth;
   means for transmitting said selected electrical signals and timing pulses to the surface of the earth;
   control means located at the surface of the earth for producing control signals representative of which receiver signal has been selected for transmission;
   means adapted for measuring the amplitude of a selected portion of a signal produced by the receiver nearest said transmitter in response to acoustic energy transmitted to said nearest receiver at least in part through the casing to produce an output signal;
   variable density means adapted to produce a variable density display of the signals produced by the receiver farthest from said transmitter in response to acoustic energy transmitted to said receiver at least in part through the media surrounding the casing;
   means responsive to said control signals for gating a timing pulse to said amplitude means whenever a signal produced by the receiver nearest said transmitter is selected for transmission to the surface of the earth and for gating a timing pulse to said variable density means whenever a signal produced by the receiver farthest from said transmitter is selected for transmission to the surface of the earth, said gated timing pulses acting to enable the operation of one of said amplitude means or variable density means; and
   means for recording said output signal and variable density display to produce logs indicative of the bonding of the cement to the casing and formations.

5. The apparatus of claim 4 wherein said control means operates to transmit representations of said control signals to said well tool to control the energization of said transmitter and the selection of receiver signals for transmission to the surface of the earth whereby the operation of said well tool will be slaved to said control means.

6. The apparatus of claim 4 wherein said control means is responsive to at least said timing pulses for producing said control signals whereby said control means will be slaved to the operation of said well tool.

7. A method of investigating characteristics of the media forming a cased well bore having a cement annulus between the casing and the surrounding earth formations, comprising:

moving a well tool having an acoustic transmitter and two acoustic receivers spaced therefrom at different distances through the casing;

repetitively energizing said acoustic transmitter to emit energy into the media surrounding said well tool and producing timing pulses representative of the times of energization, at least a portion of said energy being received by said acoustic receivers which produce electrical signals representative of said received energy;

measuring the amplitude of a selected portion of at least some signals produced by the receiver nearest said transmitter in response to acoustic energy transmitted to said nearest receiver at least in part through the casing to produce an output signal representative of the bonding between the casing and cement surrounding said casing;

recording said output signal to produce a log indicative of the bonding between the casing and cement;

selecting given timing pulses and signals produced by the receiver farthest from said transmitter in response to acoustic energy transmitted to said farthest receiver at least in part through the media surrounding the casing and using said selected pulses and signals to produce a variable density record of the signals produced by said farthest receiver, whereby said variable density record can be used in conjunction with said cement bond log to evaluate the cement bonding.

8. A method according to claim 7 further comprising:

selecting the spacing between the transmitter and the nearest receiver such that the acoustic energy arriving at said nearest receiver through the casing is measurably distinguishable from energy arriving at the nearest receiver through other media surrounding the well tool; and selecting the spacing between the transmitter and the farthest receiver such that the acoustic energy arriving at the farthest receiver through the media surrounding the casing is substantially stronger than the interfering energy arriving at the farthest receiver through the casing.

\* \* \* \* \*